Dec. 17, 1963  R. G. BEARDSLEY  3,114,521
AIRCRAFT CONTROL SYSTEM
Filed Oct. 2, 1961  2 Sheets-Sheet 1
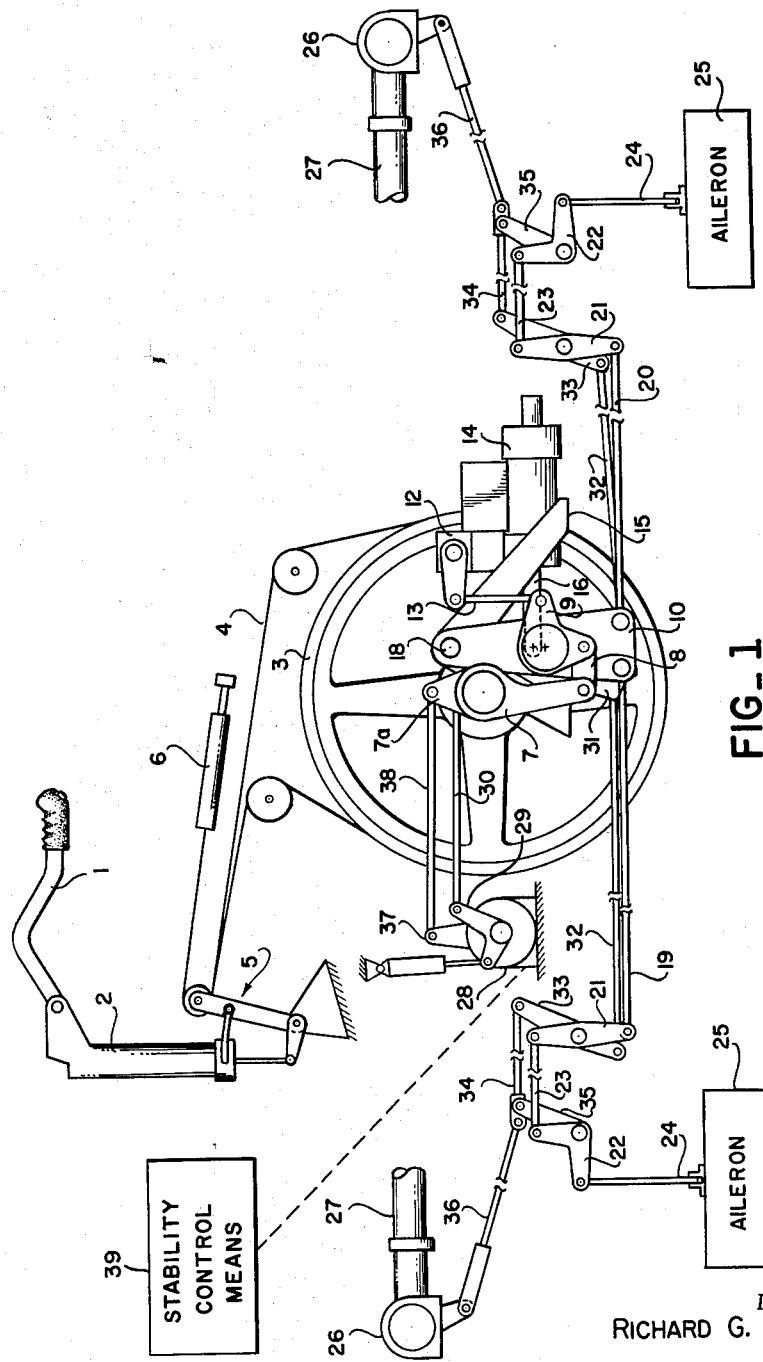
FIG_1
INVENTOR.
RICHARD G. BEARDSLEY
BY
*George C. Sullivan*
Agent Dec. 17, 1963  R. G. BEARDSLEY  3,114,521
AIRCRAFT CONTROL SYSTEM
Filed Oct. 2, 1961  2 Sheets—Sheet 2
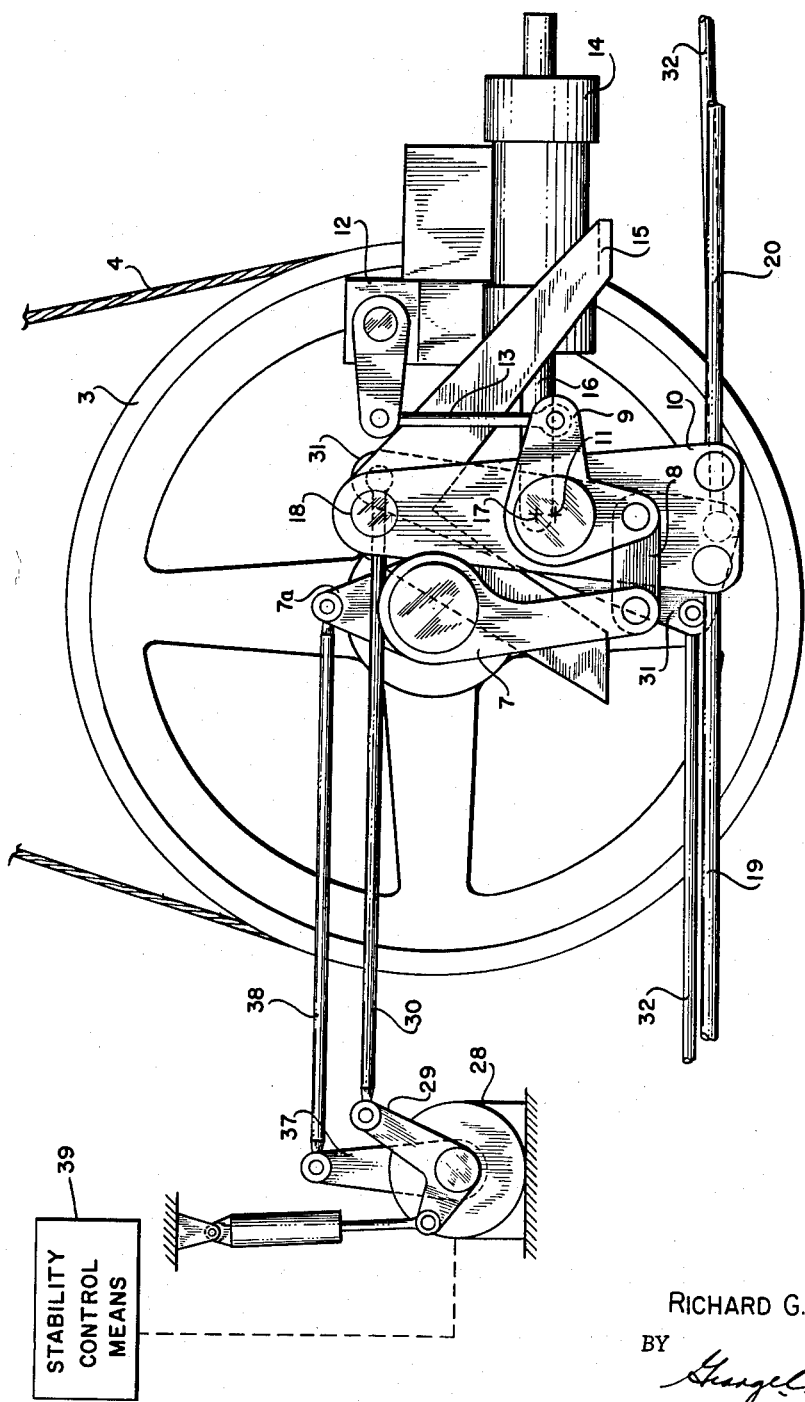
FIG_2
INVENTOR.
RICHARD G. BEARDSLEY
BY
George C. Sullivan
Agent

# United States Patent Office 3,114,521
Patented Dec. 17, 1963

3,114,521
AIRCRAFT CONTROL SYSTEM
Richard G. Beardsley, Atlanta, Ga., assignor to Lockheed
Aircraft Corporation, Burbank, Calif.
Filed Oct. 2, 1961, Ser. No. 142,060
3 Claims. (Cl. 244—76)

This invention relates to aircraft control systems, and more particularly to an axis control system for aircraft incorporating conventional type aerodynamic controls in combination with variable reaction control nozzles.

In aircraft of the VTOL (vertical take-off and landing) or STOL (short take-off and landing) types, there are times when the horizontal or forward velocity of the aircraft is insufficient to effect accurate or sufficient control of the aircraft about various axes; e.g., control about the roll axis by the conventional type aileron control surfaces. While such aileron control surfaces are normally effective during normal take-off and landing speeds, their effectivity during VTOL or STOL operation is substantially reduced or negligible. It is during these periods when the normal aileron control surfaces are ineffective that there is a critical problem in aircraft capable of VTOL or STOL operating regimes.

A solution to this lack of control feature is accomplished by use of appropriately placed variable reaction control nozzles, such as at the wing tips or proximate the location of the ailerons, and the problem of concern is how the pilot can control such variable nozzles in a normal aircraft operating manner, which is most desirable. An additional desirable feature in any such control system is one whereby the pilot can override any adjustments to the variable nozzles from the automatic stability augmentation system without feedback of any of the forces from the stability augmentation system and settings of the variable nozzles back to the pilot. This matter gains additional importance in an application utilizing hydraulic boost to the pilot's input forces for movement of the conventional control systems to enable the stability augmentation system to also operate through a similar or common linkage or control type system. In this case, it is even more important to provide an arrangement which prevents the stability augmentation control forces from feeding back to the pilot.

Accordingly, it is an object of this invention to provide a control system utilizing reaction control nozzles for control of an aircraft about an axis and which are variable through a stability augmentation control system wherein the resultant forces from the stability augmentation control system are prevented from feeding back to the pilot through the normal pilot input system to the conventional control system.

It is a further object of this invention to provide an aircraft control system incorporating reaction control nozzles for controlling the aircraft about an axis wherein the nozzles are controlled by a stability augmentation control system, the pilot in turn having the ability to override the control forces or signals of the stability augmentation control system.

Still another object of this invention is to provide an arrangement whereby the ability of the pilot to override the control signals for the stability augmentation control system is through the normal pilot input system for flight control under longitudinal speeds in which conventional type control surfaces are effective.

A still further object of this invention is to provide an aircraft control system capable of meeting all of the above objects and yet which is relatively simple and easy to maintain and operate, yet arranged so that the pilot need only one movable control member to instill input forces into the control systems regardless of whether the aircraft attitude be changed by conventional type aerodynamic control surfaces or reaction control nozzles.

Other objects and advantages of the present invention will become apparent from the following description taken in connection with the acompanying drawings in which:

FIGURE 1 represents schematically one embodiment of the present invention showing a conventional aileron control system with hydraulic boost combined with the stability augmentation system, the stability control system utilizing reaction control nozzles for control of the aircraft about its roll axis when the aerodynamic forces on the ailerons are insufficient for effective control purposes; and FIGURE 2 is an enlarged view showing now the stability augmentation control system and hydraulic boost manual system are interconnected.

Generally stated, the invention comprises the mounting of a differential lever for the stability augmentation system on the output lever of a conventional hydraulic boost arrangement, the differential lever being mounted on the output lever on a common axis with the hydraulic actuator rod. The stability augmentation differential lever is connected by push-pull rods to the reaction control nozzles as well as it is connected to a servo motor in the stability augmentation system so that adjustment of the control nozzles is accomplished by adjustment movements of the servo motor as dictated by the overall stability augmentation control system. By mounting the differential lever on the same axis as the connection between the booster assembly and the output lever, the adjustment movements from the stability augmentation control system do not feed back to the pilot's manual control column. Additionally, by a linkage connecting the pilot's input lever with the stability augmentation control system servo motor, coupled with the common axis connection of the differential lever and output lever, the pilot can override the control position of the servo motor and differential lever, and accordingly, the reaction control nozzles.

Referring more particularly to the drawings, in one embodiment of the invention aileron control movements by a pilot are accomplished through a conventional control stick 1 to rotate a torque tube 2, which transmits the input motions to a control input quadrant 3 through a cable 4. The rotary motion of torque tube 2 passes through an appropriate linkage arrangement 5 so that one end of cable 4 is moved away from quadrant 3 while the other end of cable 4 moves toward quadrant 3, cable 4 being maintained taut around quadrant 3 by a cable tension regulator 6. A conventional hydraulic boost arrangement is provided in which an input lever 7 is mounted on the axle or shaft that quadrant 3 rotates on so that input lever 7 rotates with quadrant 3. One end of input lever 7 is connected through a link 8 to a pilot's feel lever 9 pivotally monted to an output lever 10 about an axis 11. The pilot's feel lever 9 is in turn connected to control valve 12 through a control link 13, control valve 12 mounted to an actuating cylinder 14 forming a hydraulic booster assembly mounted to the aircraft structure by a support frame 15.

Rod 16 of actuating cylinder 14 is pivotally connected to output lever 10 about an axis 17 slightly above axis 11, as can best be seen in FIGURE 2. One end of output lever 10 is in turn pivotally connected to fixed support frame 15 about an axis supplied by rod or shaft 18. At the other end of output lever 10, push-pull rods 19 and 20 are connected, each in turn extending outward to a control hanger 21. Another control hanger 22 is connected to each hanger 21 through a push-pull rod 23, each hanger 22 in turn connected through a push-pull rod 24 to an aileron 25.

The structure described so far is a conventional hydraulic boost control system in which the pilot movement of stick 1 rotates input lever 7 in either direction through connection of lever 7 with quadrant 3. Such rotation of input lever 7 in turn actuates control valve 12 through link 8, pilot's feel lever 9 and link 13 so that actuator rod 16 moves output lever 10, thereby moving ailerons 25; the ratio of the distance between axis 11 and the connection between link 8 and feel lever 9 relative to the distance between axis 17 and axis 11 representing the ratio of boost to the pilot input forces by the hydraulic boost assembly.

In aircraft capable of V/STOL or hover operation there is insufficient forward speed during such type of operations, and hence insufficient air flows over the ailerons 25 for them to be effective. In order to effect any control about the roll axis of the aircraft during periods of ineffectivity of the ailerons 25, there is provided in the embodiment of the invention depicted a reaction control nozzle 26 on each wing, each of which is connected to a fluid supply (not shown) through conduits or ducts 27. The nozzles 26 are of the modulated or variable type so that there can be a relative unbalance between them to effect control of the aircraft about the roll axis during vertical or hover operations. During such periods of vertical or hover operations, control signals are supplied from a stability augmentation system to a servo motor 28, such as by roll rate gyros. Control movements from the servo motor 28 are transmitted through a bell crank 29 and push-pull rod 30 to a stability augmentation differential lever 31 that is pivotally connected to output lever 10 about axis 17. Push-pull rods 32 extend in both directions from the other end of differential lever 31 to hangers 33, push-pull rods 34, hangers 35 and push-pull rods 36 connected to variable control nozzles 26; the hangers 33 and 35 mounted on the same pivotal connections to the airframe structure as are hangers 21 and 22 respectively. In this arrangement, as one of the nozzles 26 is opened, the other is closed thereby setting up a differential in their relative reaction forces and imparting a stabilizing control force to the aircraft about the roll axis as signaled by any appropriate automatic stabilization control system or means 39 feeding signals into servo motor 28. One unique feature of this system is the arrangement of pivotally mounting the stability augmentation differential lever 31 at the same pivot point 17 the actuating cylinder piston rod 16 is mounted to output lever 10, which prevents the stability augmentation control forces from feeding back to the pilot. This is accomplished in that forces from the differential lever 31 have no effect on the position of booster control valve 12, and hence no force is fed back to the pilot through the booster feel lever 9. Likewise, this same arrangement permits the pilot to manually override the stability augmentation system wherein movement of the control stick 1 will move output lever 10 about axis 18, which in turn will move differential lever 31 to a new position relative to output lever 10 as the pivotal connection between push-pull rod 30 and differential lever 31 will remain stationary until moved by servo motor 28. Thus, as differential lever 31 is pivoted by movement of stick 1, the reaction of nozzles 26 is varied accordingly, and in this manner, notwithstanding the position of differential lever 31 as established by servo motor 28, the pilot can change the position of differential lever 31 by actuation of stick 1.

The servo motor 28 may be tied in to an autopilot system or control for operation during horizontal flight wherein the signals from the autopilot system can be transmitted to the input lever 7 through controlling horn 37, push-pull rod 38 and horn extension 7a on input lever 7. In this manner, servo motor 28 may be clutch operated so that only one system at a time is operative; that is, either stability augmentation control or autopilot. It is of course to be realized that a separate servo motor input mechanism for autopilot operation may be utilized rather than having a clutching arrangement in servo motor 28 as depicted.

Thus, it can be seen that through practice of this invention there is provided a system where signals from a stability augmentation control system to actuate variable reaction nozzles is combined with a conventional hydraulic boost control system wherein signal inputs to the nozzles from the stability augmentation control system are isolated from the conventional system to prevent any signal or force feedback to the pilot through the conventional hydraulic boost control system. Furthermore, it can also be seen that this invention further provides, in combination with the last cited feature, the feature of giving the pilot the ability and capability of overriding the automatic stability augmentation control system to effect manual control over the aircraft, the overriding control provided through this conventional control system automatically so that the pilot need not take any positive action to tie in the additional control, nor does he need to operate any control means other than his conventional stick or wheel.

While a particular embodiment of the invention has been shown and described, it will be obvious to those skilled in the art that various changes and modifications may be made without departing from the invention and it is intended to cover all such modifications and equivalents as fall within the true spirit and scope of this invention.

What is claimed is:

1. A control system for an aircraft to move conventional control surfaces through a conventional hydraulic boost system responsive to and controlled by pilot input forces and including an output lever moved about a fixed axis in the aircraft by an actuator rod pivotally connected to the output lever in combination with a pair of variable reaction control nozzles arranged to act in opposition to each other, a differential lever pivotally mounted to said output lever, stability control means interconnected to said differential lever, and means interconnecting said differential lever with said variable reaction nozzles, said pivotal connection of the differential lever to the output lever being about the same axis as the pivotal connection of the actuator rod to the output lever whereby forces from the stability control means are isolated from feeding back to the source of pilot input forces.

2. A control system for an aircraft to move conventional control surfaces through a conventional hydraulic boost system responsive to and controlled by pilot input forces in combination with a pair of variable reaction controlled nozzles arranged to act in opposition to each other, a stability control means performing the function of sensing aircraft attitude and including means generating signals and corrective signals relative thereto, means interconnecting the signal generating means and the nozzles to transmit corrective signals to the nozzles, and means connecting said pilot input forces into the interconnecting means between the stability control signal generating means and the nozzles whereby the pilot has manual override of the stability control means signals through the same control system and force input means for moving conventional control surfaces.

3. A control system for an aircraft to move conventional control surfaces through a conventional hydraulic boost system responsive to and controlled by pilot input forces and including an output lever moved about a fixed axis in the aircraft by an actuator rod pivotally connected to the output lever in combination with a pair of variable reaction control nozzles arranged to act in opposition to each other, a differential lever pivotally mounted to said output lever, a stability control means performing the function of sensing aircraft attitude and including means generating signals and corrective signals relative thereto, said stability control means interconnected to said differential lever, means interconnecting said differential lever with said variable reaction nozzles, said pivotal connection of the differential lever to the output lever being about the same as the pivotal connection of the actuator rod to the output lever whereby forces from the stability control means are isolated from feeding back to the source of pilot input forces while at the same time the pilot has manual override of the stability control means to change the variable reaction nozzles through the same control system and force input means for moving conventional control surfaces.

References Cited in the file of this patent

UNITED STATES PATENTS 3,010,681     Sproull _____ Nov. 28, 1961

FOREIGN PATENTS 160,981     Australia _____ Feb. 8, 1955